Feb. 17, 1959  L. A. OHLINGER ET AL  2,874,107
DEVICE FOR TREATING MATERIALS
Filed May 8, 1946  6 Sheets-Sheet 2

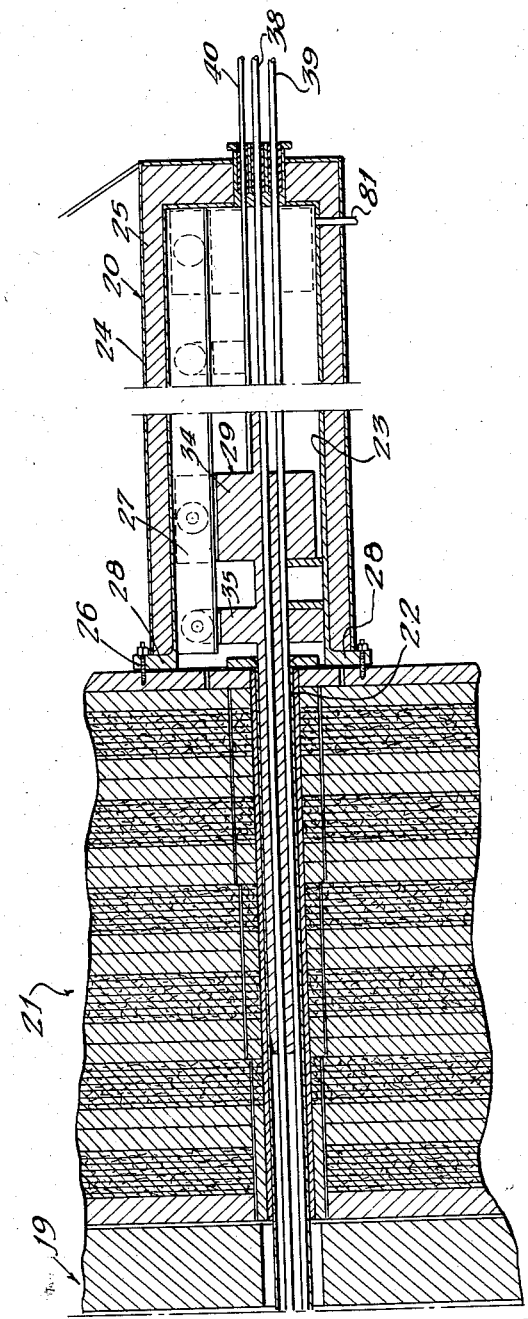

Witnesses:
Herbert E. Metcalf.
Estill E. Ezell

Inventors:
Leo A. Ohlinger
Frederick Seitz
Gale J. Young
By: Robert A. _____
Attorney.

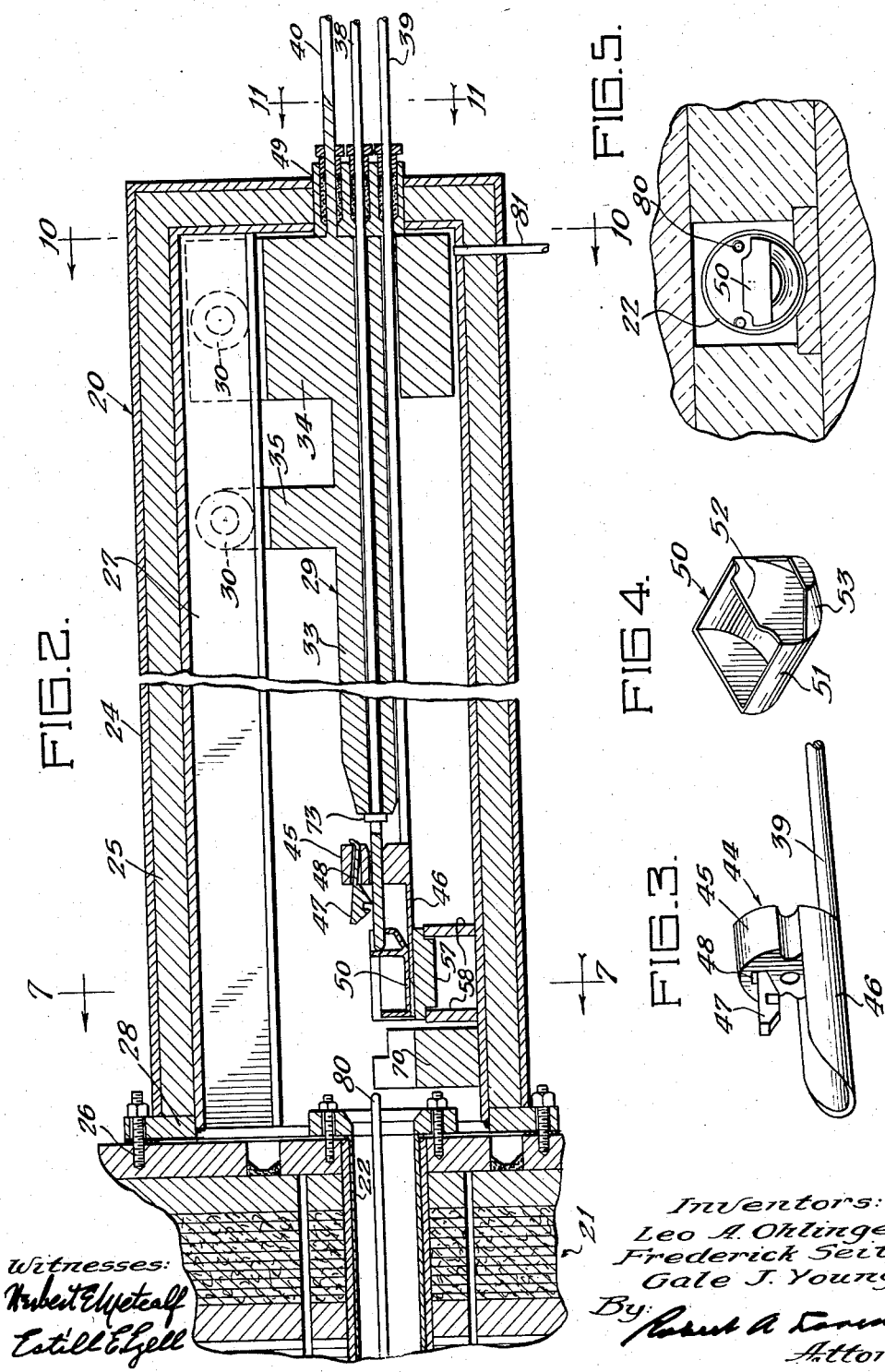

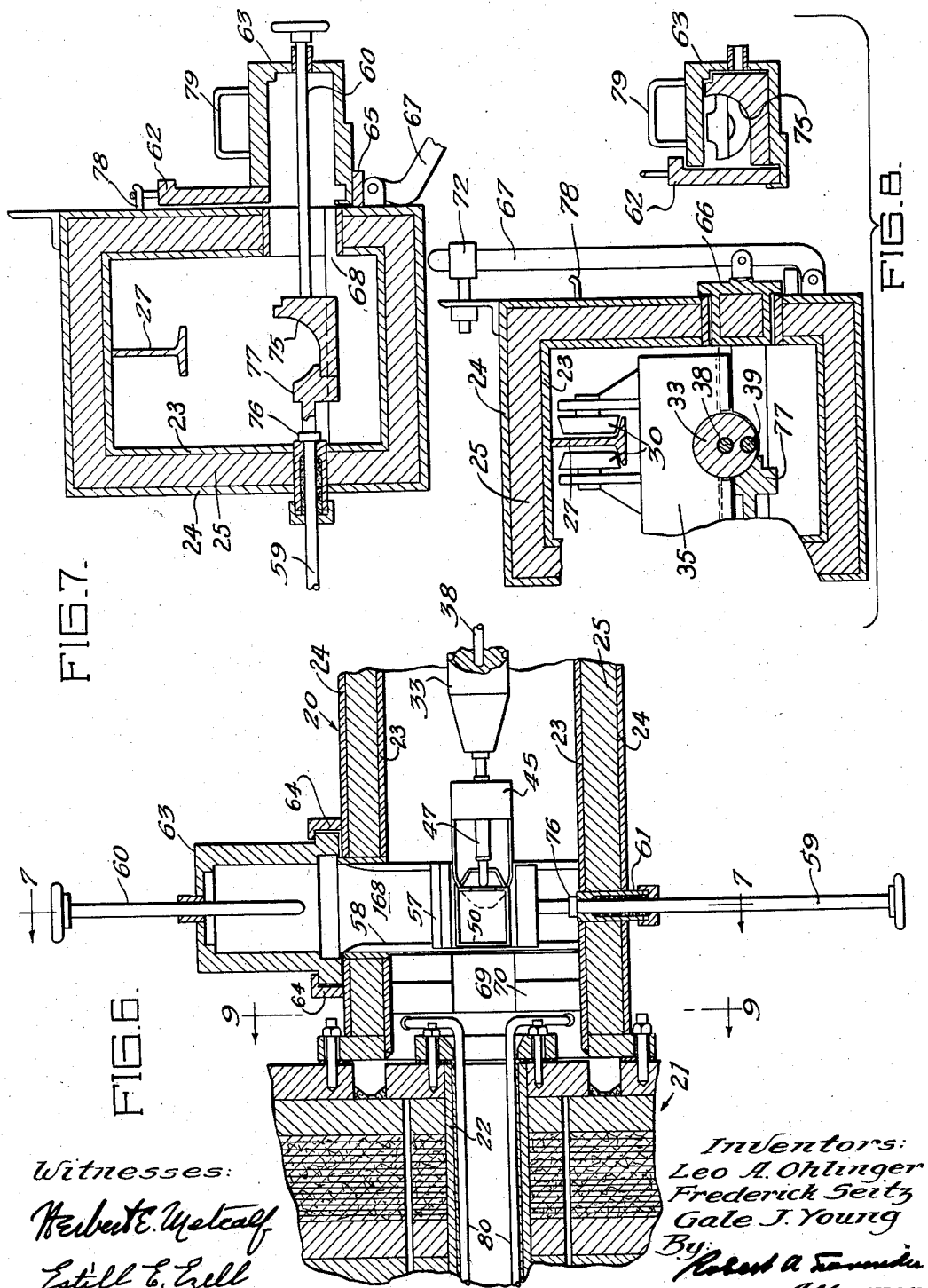

Feb. 17, 1959 L. A. OHLINGER ET AL 2,874,107
DEVICE FOR TREATING MATERIALS
Filed May 8, 1946 6 Sheets-Sheet 5

Witnesses:
Herbert E. Metcalf
Estill E. Ezell

Inventors:
Leo A. Ohlinger
Frederick Seitz
Gale J. Young
By: Robert A. [signature]
Attorney.

United States Patent Office 2,874,107
Patented Feb. 17, 1959

2,874,107

DEVICE FOR TREATING MATERIALS

Leo A. Ohlinger, Chicago, Ill., Frederick Seitz, Pittsburgh, Pa., and Gale J. Young, Chicago, Ill., assignors to the United States of America as represented by the United States Atomic Energy Commission Application May 8, 1946, Serial No. 668,185

3 Claims. (Cl. 204—193.2)

This invention relates generally to neutronic reactors and more particularly to novel devices used in and in combination with such reactors.

In neutronic reactors a neutron fissionable isotope such as $U^{233}$, $U^{235}$, or $94^{239}$ or mixtures thereof is subjected to fission by absorption of neutrons and a self-sustaining chain reaction is established by the neutrons evolved by the fission. In general such reactors comprise bodies of compositions containing such fissionable material, for example, natural uranium, disposed in a neutron slowing material which slows the neutrons to thermal energies. Such a slowing material is termed a neutron moderator. Carbon, beryllium, and $D_2O$ (heavy water) are typical moderators suitable for such use. Heat is evolved during the reaction which is removed by passage of a coolant through the reactor or in heat exchange relationship therewith. Specific details of the theory and essential characteristics of such reactors are set forth in Fermi et al. Patent 2,708,656, dated May 17, 1955.

This invention comprises, broadly, a novel apparatus for irradiation of material in a neutronic reactor and for safely removing such material from the reactor in a radioactive state.

More specifically, the invention includes novel test hole construction permitting insertion of specimens, such as graphite, aluminum and other materials within a neutronic reactor for the purpose of subjecting the specimens to irradiation by neutronic activity therein, and subsequent transfer of the irradiated specimens from the reactor. A coffin shield is provided to receive the irradiated specimens from the test hole comprising a completely enclosed container of material effective as a biological shield to shield personnel from harmful radioactive emission from the specimens and chambered reactor both during the transfer periods and while the specimens are being subjected to irradiation within the reactor. Also included in the invention are the novel features of atmosphere replacement by an inert gas, cooling of the specimens during irradiation, and transfer of irradiated specimens to a specimen coffin.

Hence, an object of the present invention is to provide a novel test hole construction for neutronic reactors, and a novel coffin construction for removing irradiated specimens safely from the test hole construction.

Other objects and advantages of the invention will become apparent to persons skilled in the art upon examination of the following description and the accompanying drawings, in which:

Figs. 1a and 1b taken together comprise a vertical cross-sectional view through a preferred embodiment of a test hole construction and coffin incorporating the teachings of the present invention shown operatively mounted in respect to a neutronic reactor and shield;

Fig. 2 is an enlarged sectional view of a portion of the device of Figs. 1a and 1b, illustrating apparatus for remotely handling specimens in boat-like containers within a surrounding biological shield;

Fig. 3 is a perspective view of a scoop employed for detachable engagement with a specimen receiving boat;

Fig. 4 is a perspective view of a specimen receiving boat;

Fig. 5 is a cross sectional view partly in elevation on the line 5—5 of Fig. 1b;

Fig. 6 is a view, partially in plan and partially in horizontal section, showing in detail the specimen handling mechanism;

Fig. 7 is a cross sectional view, partially in elevation, taken on line 7—7, Figs. 2 and 6;

Fig. 8 is a partial vertical sectional view similar to Fig. 7, but showing the specimen coffin removed from the coffin shield, the breach-block closure in place, and the test hole construction plug moved into shielding position;

Figure 1B:
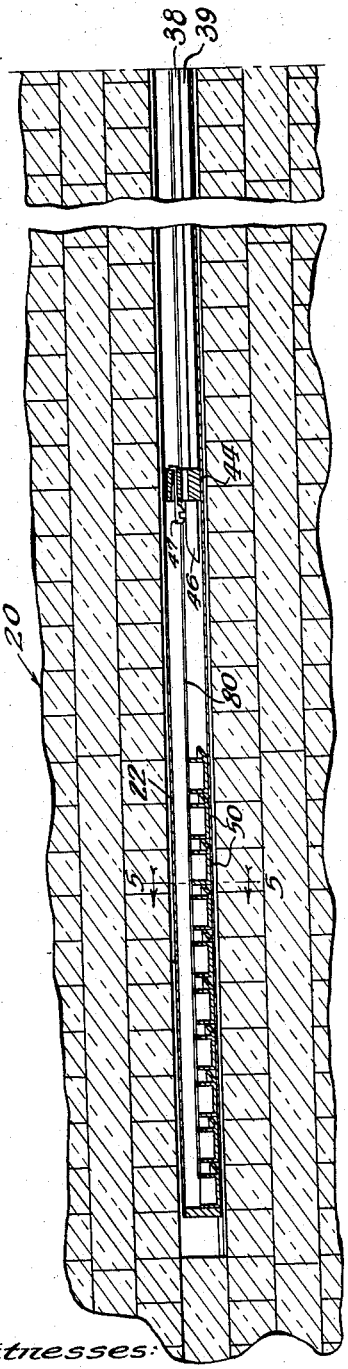
Figure 16:
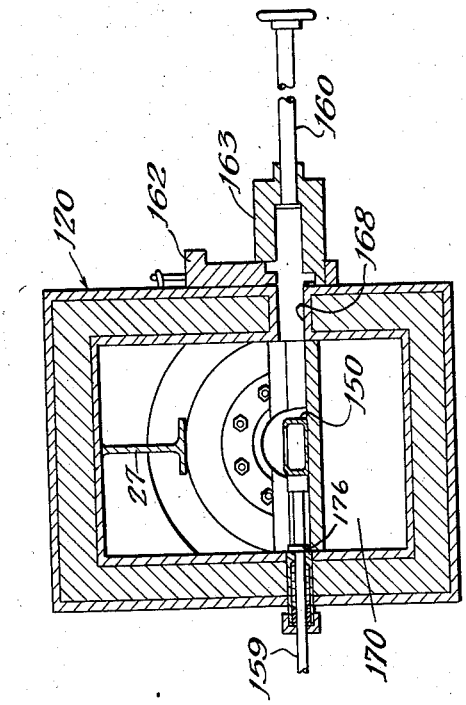
Fig. 16 is a cross sectional view on line 16—16 of Fig. 15.
Figure 9:
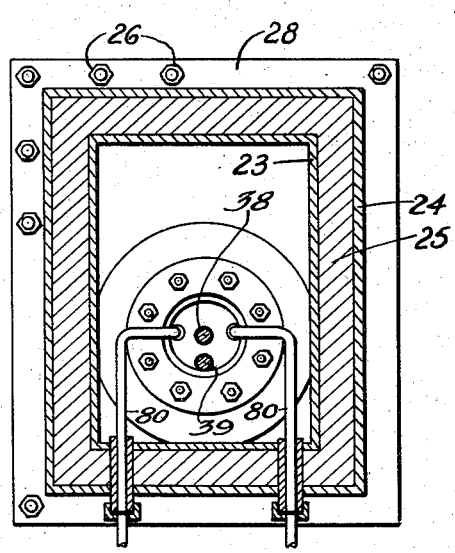
Fig. 9 is a cross sectional view taken on line 9—9, Fig. 6.
Figure 10:
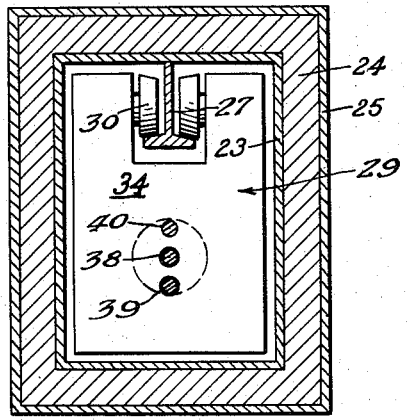
Fig. 10 is a cross sectional view taken on line 10—10, Fig. 2.
Figure 11:
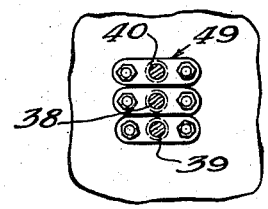
Fig. 11 is a cross sectional view partly in elevation taken on line 11—11, Fig. 2.

The embodiment of the invention shown in Figs. 1 through 11 comprises a generally elongated coffin shield 20, rectangular in cross section, mounted in clamped engagement with the outer surface of a biological shield 21 of a neutronic reactor 19 illustrated in fragmentary section (Figs. 1a, 1b), an aluminum thimble 22 which forms a liner within an elongated chamber or test hole extending through the biological shield 21 into the inner portion of the reactor 19, and mechanism, described below, for transferring specimens into and out of thimble 22. Coffin shield 20 may be of laminated construction comprising inner and outer steel elements 23 and 24 respectively, and an inner element 25 of lead. The mouth of the coffin shield 20 is provided with a radially extended flange 28 by which the coffin shield 20 is rigidly secured to the outer wall of the biological shield 21 by means of clamping bolts 26. Secured to the upper wall of element 23 of the coffin shield 20 is an inverted trolley T beam 27, as best shown in Figs. 2 and 7, to permit longitudinal transfer of mechanism later described into and out of the thimble 22 which, as stated, forms the inner wall of a chamber or test hole extending through the biological shield 21 and into the inner active portion of the neutronic reactor. The thimble 22 is flanged at its outer open end to form a sealing and securing ring.

A counter-weighted plug 29, suspended from trolley beam 27 by 2 pairs of trolley wheels 30, is disposed within coffin shield 20 when fully retracted (Fig. 2) and comprises an elongated shank portion 33 which may be moved into the portion of thimble 22 traversing the biological shield 21 to provide an effective shielding closure for thimble 22 during operation of the reactor 19. Plug 29 is provided with a counterweight portion 34 and a mounting and shielding portion 35. A pair of spaced bores extending through the counterweighted portion 34 and the shank portion 33 of plug 29 are provided to permit both a sectional ejector rod 38 and a sectional scoop handle 39 to extend therethrough in slidable relation to the plug 29. Rod 38 and handle 39 project through the outer wall of the coffin shield in fluid relation thereto by means of a compound stuffing box 49 (Fig. 11) which also accommodates a rod handle 40 in like manner for movement of the plug 29 within the coffin shield 20 from a point exterior thereof. A scoop 44 (Figs. 2 and 3) is provided at the interior end of scoop handle 39 and comprises an upstanding back in the form of a generally cylindrical portion 45 to which rod 39 is attached, a semicylindrical tongue portion 46, and a serrated latch 47 having one end extending through a chamber 48 of cylindrical portion 45 and provided with a curved end to prevent extraction, said chamber being generally divergent towards the serrated portion of the latch to allow vertical pivotal movement of the latch.

A boat 50 (Figs. 2 and 4) that may be of aluminum comprises a closed end semicylindrical portion 51, one end plate having a raised portion 52, and an extending end cap 53 in the form of a truncated cone. Boat 50 provides a container for conveying specimens to be irradiated in and out of the thimble 22. The end cap 53 is engaged by the latch 47 for movement of the boat 50 into and from the thimble 22. The method of loading and unloading the individual boats from the device will be later described.

Referring to Fig. 6, a carrier 57 is slidably mounted on a pair of guide rails 58 for movement transversely of the coffin shield 20, said movement being manually effected from points exteriorly of the coffin shield 20 by means of slidably mounted plungers 59 and 60, plunger 59 being mounted in fluid sealing relation to the coffin shield by means of a stuffing box 61 to prevent escape of helium or other gas with which the air in the device may be replaced during irradiation periods for the purpose of reducing neutronic absorption within the reactor 19 to eliminate the personnel hazard of escaped irradiated gas. A specimen coffin 63 is detachably positioned by means of angular guide brackets 64 on the coffin shield 20 in registry with a specimen transfer aperture 68, the lower wall of coffin 63 resting on a supporting plate 65 (Fig. 7). Coffin 63 includes a cover 62 receivable in a complementary channel to complete a biological shielded container for transfer of irradiated specimens. Plunger 60 extends through the end wall of coffin 63 in slidable relation therewith to permit an operator to move carrier 57 out of the specimen coffin 63 and into the coffin shield 20.

Prior to loading the device, with the neutronic reactor shut down, a breech-lock closure 66, shown clamped in place by means of lever 67 in Fig. 8, is removed by pivoting the lever 67 downwardly into a position of non-interference with the specimen transfer aperture 68, best shown in Fig. 7. If radioactive specimens are to be loaded, the coffin 63 containing the specimens is attached to the coffin shield 20 in the manner above described, the cover 62 raised, and the carrier 57 and sample boat 50 moved by means of plunger 60 from within the specimen coffin 63 to a position along guide rails 58 for registry with thimble 22 as shown in Fig. 6.

With boat 50 supported on carrier 57 in registry with thimble 22, handle 39 is moved in a direction toward the reactor 19, thereby sliding boat 50 across a trough portion 69 of an adjacent shield block 70 and into thimble 22 to a desired position therein. Rod 39 is made up of demountable sections since the total external length is substantial when in the fully retracted position. Additional specimen boats 50 may be loaded in like manner until the desired loading is obtained. Upon completion of loading, plug 29 is moved from the extracted position shown in Fig. 2 to the operative position as shown in Fig. 1a by movement of handle 40 toward the reactor 19. Breechblock closure 66 is pivoted into position as shown in Fig. 8 by means of lever 67 and locked in place by a suitable latch 72. The device is now in readiness for irradiation of the specimens.

After the loading operation has been completed and the breech-block 66 is in position the atmospheric air within the enclosed portion of the device including the coffin shield 20 and the thimble 22 is replaced with a gas having a low neutron absorbing characteristic such as helium gas. A pair of fluid conducting tubes 80 extend through the bottom wall of the coffin shield 20 and into the thimble 22 for the introduction of neutronically inert fluid, such as helium, terminating adjacent the closed end thereof, and outlet tube 81 with a suitable valve, not shown, is provided for drawing off the air while filling the system with helium, and for drawing out the helium at the termination of the irradiation period prior to unloading the device. As shown in the drawings, gaskets or other suitable seals are employed marginally of all apertures extending through the coffin shield walls and around the mounting flange to effectively seal the interior of the device against the escape of the helium during use.

At the termination of the irradiation period the device is unloaded in the following manner. Plug 29 is returned to the retracted position (Fig. 2) by retraction of handle 40. Ejector rod 38 is likewise retracted, thus allowing latch 47 of scoop 44 to pivot downward and engage raised portion 52 of a boat 50. Scoop 44 having boat 50 in complementary engagement with tongue portion 46 thereof is withdrawn from thimble 22 by means of scoop handle 39, ejector rod 38 being simultaneously withdrawn. Registration between boat 50 and transfer aperture 68 is automatic upon full retraction of scoop handle 39 due to abutment between the truncated end of the boat and the inner end of ejector rod 38 which is maintained in spaced relation to the end of shank portion 33 of plug 29 by means of a limit collar 73. Scoop 44 is withdrawn from boat 50 during this step. At the point of abutment mentioned, latch 47 is cammed over the end portion of rod 38 thereby disengaging the boat 50 which rests on an arcuate supporting surface 75 of carrier 57.

Plunger 59 is provided at its inner end with a terminal portion 77 having an arcuate surface and a shoulder adapted to engage the adjacent wall of carrier 57 in the manner shown in Fig. 7. Inward movement of plunger 59 conveys carrier 57 from a position of registry with thimble 22 through the transfer aperture 68 and into the specimen coffin 63 to be supported on the lower wall thereof (Fig. 8). Plunger 59 is returned to its normal position (Fig. 7) with a limit collar 76 abutting stuffing box 61. Coffin cover 62 which hangs from a supporting bracket 78 during each removal operation is detached and lowered into a position of closure as shown in Fig. 8. The coffin 63 may then be withdrawn by means of a handle 79 from the channel defined by guide rails 64 for removal from the device. Another coffin may then be inserted within the guide rail channel in the above described manner, the operation being repeated for removal of the next specimen boat 50.

Figure 12:
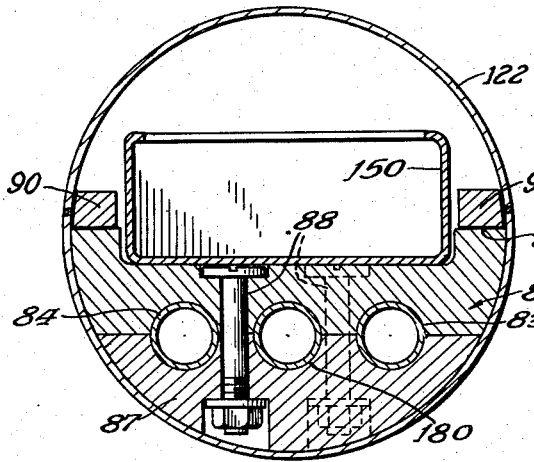
Fig. 12 is an enlarged vertical cross sectional view through the thimble in the shield portion of an alternate embodiment of the invention wherein a liquid coolant is employed to reduce the temperature of specimens within the thimble.
Figure 14:
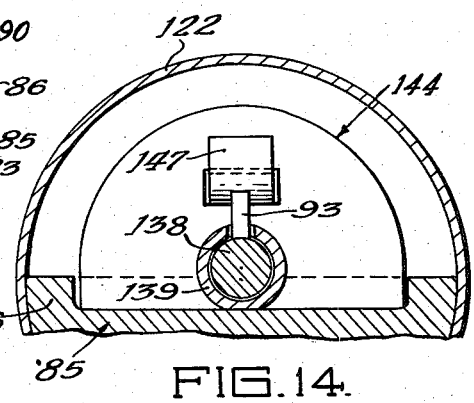
Fig. 14 is a fragmentary cross sectional view partly in elevation taken on line 14—14 of Fig. 13, showing the relationship of the scoop to the thimble.

The alternate embodiment of the present invention as disclosed in Figs. 12 through 16 is generally similar to the above described embodiment with the exception that the device incorporates means for the introduction of liquid coolant into the thimble 122 by provision of in and out fluid conduits 83 and 84 respectively (Fig. 12). A single conduit 180 is disposed intermediate the coolant conduits for the introduction of helium gas. Coffin shield 120 and counterweighted plug 129 are similar to coffin shield 20 and plug 29 with the exception of minor details as described below. The in and out fluid conducting conduits 83 and 84, through which water may be circulated as a coolant, and the helium inlet conduit 180, are imbedded in an elongated element 85 extending from the mouth of coffin shield 120 substantially to the closed end of thimble 122 which may be of steel for the portion disposed in the biological and thermal shields and of graphite for the portion disposed in the reactor proper. Element 85, semi-circular in cross section, comprises an upper portion 86 provided with upwardly open channel having a planiform base surface adapted to receive specimen boats 150 through which channel the boats may be slid axially along the thimble 122, and a lower portion 87 maintained in clamped engagement therewith by means of clamping bolts 88. Element 85 is provided with suitable bores through which the conduit tubes extend axially, in desired spaced relation therebetween and in good thermal contact therewith. Ribs 90 welded to the thimble 122 maintain the element 85 in position as shown.

Specimen boat 150 is of shallow tray form with a planiform base to promote heat conduction between the specimens therein and the cooling liquid in conduits 83 and 84 through the intervening graphite member 85. The method of loading and unloading boat 150 from the device is generally similar to the method described in the above embodiment, the carrier being eliminated to permit direct heat transfer between the specimen boat 150 and a graphite bed later described. Assuming specimens to be irradiated are to be loaded, with the reactor shut down, the specimens are unloaded from the closed specimen coffin 163 by positioning the specimen coffin 163 adjacent the transfer aperture 168 of the coffin shield 120, raising the coffin cover 162 and moving the specimen boat 150 transversely of the coffin shield 120 by means of plunger 160 into a position of abutment with the inner end of plunger 159 the boat then being in position of registry with thimble 122 due to limit collar 176, properly positioned to insure registry of the boat 150. Ejector rod 138 is shown capped in Fig. 15 to prevent the escape of helium from the device during irradiation periods, cap 92 being removed during loading and unloading periods. The outer end of rod 138 is shown tapped to receive extension sections, the outer end of scoop handle 139 being externally threaded for a like purpose. Movement of ejector rod 138 toward the reactor cams latch 147 into a position of non-engagement with latch bracket 152 of scoop 144, the inner rod end abutting bracket 152 to force the specimen boat 150 over the half shield block 170 and along the channel of graphite bed 85 to the desired position within thimble 122. Upon completion of loading, the counterweighted plug 129 is moved by means of plug handle 140 into the shielding position with shank 133 of plug 129 disposed within thimble 122. With the removal of specimen coffin 163 and insertion of a suitable breach plug (not shown) to form a closure for transfer aperture 168, and replacement of atmospheric air within the device with a neutronically inert gas, the device is ready for operation.

Figure 13:
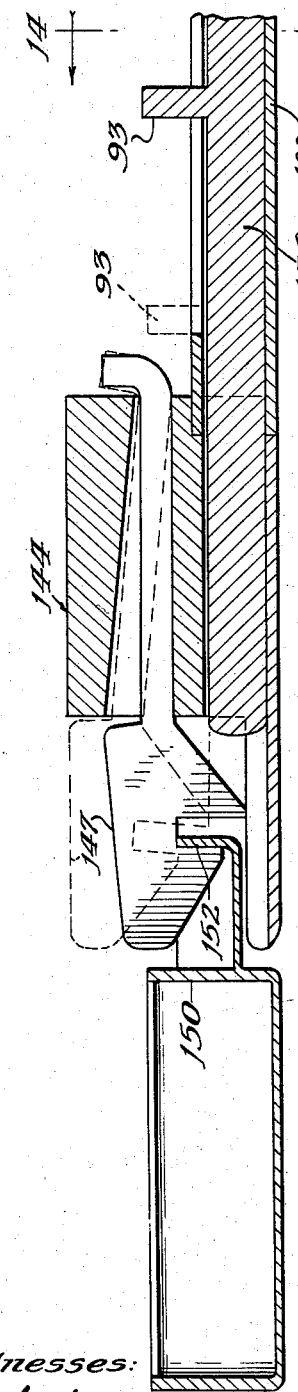
Fig. 13 is a vertical longitudinal cross sectional view through detachable engagement means between the scoop and boat of the embodiment of Fig. 12.
Figure 15:
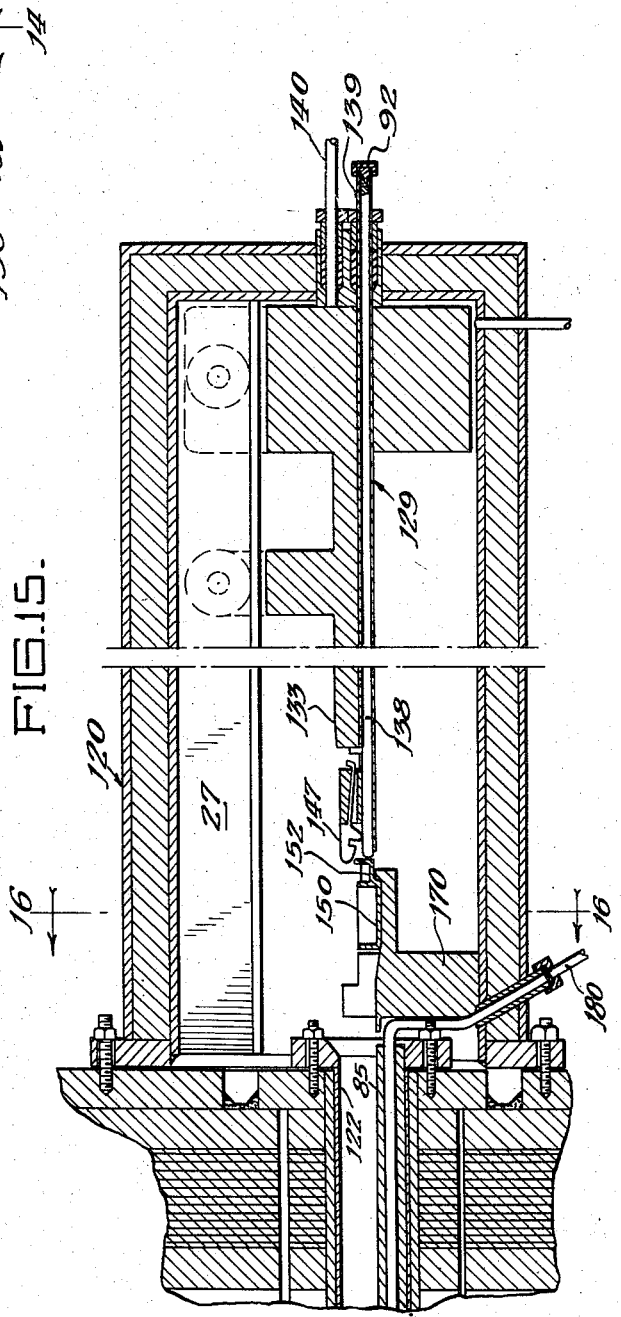
Fig. 15 is a longitudinal cross sectional view of the modification of Fig. 12 similar to Fig. 2.

Removal of the specimen boats 150 is effected by withdrawing plug 129 to the retracted position shown in Fig. 15, and individually retracting boats 150 in the following manner. With ejector rod 138 in the retracted position as shown in Fig. 13, the scoop handle and ejector rod assembly is moved into the thimble 122 until latch 147 is cammed into engagement with the outer-most specimen boat 150. Upon withdrawal of the assembly, stop pin 93 abuts the end of plug 129 to prevent further withdrawal, scoop handle 139 being further withdrawn to cam latch 147 out of engagement with bracket 152 of boat 150 along the ejector rod 138 to the position shown in Fig. 15, with stop pin 93 in the dotted position as shown in Fig. 13. Upon removal of boat 150 to specimen coffin 163 as above described, the device is ready for removal of a second specimen boat.

It is apparent that the above described apparatus permits an operator to safely handle radioactive material during loading and unloading of the associated reactor. Normally the reactor is shut down during loading, but if desired, specimen transfer may be effected during operation of the reactor, as for example when a reactor is provided with a plurality of test holes and material is undergoing irradiation in others. In this event, care must be taken by the operator to avoid neutrons escaping from the reactor through the specimen transfer aperture during replacement of the aperture closure with the specimen coffin and subsequent removal of said coffin. Removal of helium prior to unloading and replacement of air by helium following the loading operation may be accomplished during operation of the reactor.

Other modifications of mechanical structure for the practice of the disclosed invention will become apparent to persons skilled in the art, the specific devices above described being disclosed for the purpose of illustration rather than limitation, the scope of the invention being limited only as defined by the appended claims.

What is claimed is:

1. In combination with a neutronic reactor having an active portion and a radiation shield surrounding the active portion, a device for irradiation of materials comprising an elongated chamber extending from the outer face of the shield into the active portion and having a mouth at said outer face, a shield box having an open end sealed to the outer face of the shield and surrounding the mouth of the chamber, a removable door in a side wall of the shield box, positioning means operable from the exterior of the shield box to move specimens in the chamber between the shield box and the active portion, the positioning means comprising a rod extending through the outer end of the shield box and having a latch at the inner end thereof, and means operable from the exterior of the shield box selectively to engage and disengage specimens with and from the positioning means and comprising a second rod parallel with the first rod and engaging the latch.

2. In combination, a device for treating material comprising an open-end chamber; a box having a closed end and an open end secured to the open end of the chamber; a boat for containing the material to be treated; a scoop for moving the boat between the chamber and the box, the scoop having an upstanding back, a latch mounted in the back and being engageable with the boat, and a tongue fitting beneath the boat during engagement thereof with the latch; a handle member secured to the scoop and extending through the closed end of the box to the exterior thereof; and a release member projecting through the closed end of the box and the back of the scoop and having an inner end capable of contacting the latch to shift the same out of engagement with the boat.

3. The combination specified in claim 2 and further comprising a plug slidably mounted in the box for movement between a first position in which it closes the open end of said chamber and a second position in which it engages the closed end of the box and leaves open the open end of said chamber, the release member being engageable with the plug in its second position so as to enable the inner end of the release member to serve as a stop to limit movement of the boat toward the closed end of the box.

References Cited in the file of this patent

UNITED STATES PATENTS

| | | |
|---|---|---|
| 775,197 | Somes | Nov. 15, 1904 |
| 812,364 | Ramage | Feb. 13, 1906 |
| 980,004 | Reeder | Dec. 27, 1910 |
| 1,278,307 | Cressler | Sept. 10, 1918 |
| 1,386,919 | Wild | Aug. 9, 1921 |
| 1,843,282 | Horn et al. | Feb. 2, 1932 |
| 1,876,960 | Kenworthy | Sept. 13, 1922 |
| 2,206,634 | Fermi et al. | July 2, 1940 |
| 2,327,438 | Kuhn | Aug. 24, 1943 |

(Other references on following page)

FOREIGN PATENTS

| | | |
|---|---|---|
| 861,390 | France | Oct. 28, 1940 |
| 233,011 | Switzerland | Oct. 2, 1944 |

OTHER REFERENCES

Smyth: "A General Account of the Development of Methods of Using Atomic Energy for Military Purposes Under the Auspices of the U. S. Gov't.", 1940–1945, pages 84, 85 (1945), Supt. of Doc., Washington 25, D. C., also page 103.

De Hoffman et al.: Phy. Rev. 72, 567–569, (1947).

Seren et al.: Phy. Rev. 72, 888–901, (1947).